(12) United States Patent
Suzuki et al.

(10) Patent No.: US 11,662,451 B2
(45) Date of Patent: May 30, 2023

(54) RADAR APPARATUS AND COMPUTER READABLE MEDIUM

(71) Applicant: MITSUBISHI ELECTRIC CORPORATION, Tokyo (JP)

(72) Inventors: Daisuke Suzuki, Tokyo (JP); Shoei Nashimoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 589 days.

(21) Appl. No.: 16/955,459

(22) PCT Filed: Jan. 17, 2018

(86) PCT No.: PCT/JP2018/001245
§ 371 (c)(1),
(2) Date: Jun. 18, 2020

(87) PCT Pub. No.: WO2019/142271
PCT Pub. Date: Jul. 25, 2019

(65) Prior Publication Data
US 2020/0371202 A1    Nov. 26, 2020

(51) Int. Cl.
*G01S 13/34* (2006.01)
*G01S 7/36* (2006.01)
*G01S 7/02* (2006.01)

(52) U.S. Cl.
CPC .............. *G01S 13/345* (2013.01); *G01S 7/36* (2013.01); *G01S 7/023* (2013.01)

(58) Field of Classification Search
CPC ...... G01S 13/343; G01S 13/345; G01S 7/023; G01S 7/36
See application file for complete search history.

(56) References Cited

U.S. PATENT DOCUMENTS

| 5,181,038 A | 1/1993 | Asbury et al. |
| 5,677,695 A | 10/1997 | Suzuki et al. |
| 5,828,333 A | 10/1998 | Richardson et al. |

(Continued)

FOREIGN PATENT DOCUMENTS

| CN | 101089853 A | 12/2007 |
| JP | 59-79175 A | 5/1984 |

(Continued)

OTHER PUBLICATIONS

U.S. Office Action for U.S. Appl. No. 16/341,745, dated Mar. 11, 2022.

(Continued)

*Primary Examiner* — Timothy A Brainard
(74) *Attorney, Agent, or Firm* — Birch, Stewart, Kolasch & Birch, LLP (57) ABSTRACT

A radar (30) is an FMCW radar. A determination unit (901) of the radar (30) executes at least one program of an attenuation determination program (324a), which determines whether an abnormal attenuation is present in a beat signal (S305), and a frequency characteristic determination program (325a), which determines whether an anomaly is present in a frequency characteristic of the beat signal (S305). The radar (30) can determine whether the beat signal (S305) is abnormal by software by executing the attenuation determination program (324a) and the frequency characteristic determination program (325a).

16 Claims, 10 Drawing Sheets

(56) References Cited

U.S. PATENT DOCUMENTS

| | | |
|---|---|---|
| 5,923,280 A | 7/1999 | Farmer |
| 5,963,163 A | 10/1999 | Kemkemian et al. |
| 6,226,389 B1 | 5/2001 | Lemelson et al. |
| 9,575,160 B1 | 2/2017 | Daws et al. |
| 2004/0155812 A1 | 8/2004 | Pleva et al. |
| 2006/0012511 A1 | 1/2006 | Dooi et al. |
| 2006/0181448 A1 | 8/2006 | Natsume et al. |
| 2007/0018886 A1 | 1/2007 | Watanabe et al. |
| 2008/0231497 A1 | 9/2008 | Sakamoto |
| 2010/0141504 A1 | 6/2010 | Szajnowski |
| 2010/0304661 A1 | 12/2010 | Cornwell |

FOREIGN PATENT DOCUMENTS

| | | | |
|---|---|---|---|
| JP | 59079175 A | * | 5/1984 |
| JP | 05-240947 A | | 9/1993 |
| JP | 05-297122 A | | 11/1993 |
| JP | 07-084035 A | | 3/1995 |
| JP | 7-146359 A | | 6/1995 |
| JP | 10-253753 A | | 9/1998 |
| JP | 2002-014159 A | | 1/2002 |
| JP | 2002-139565 A | | 5/2002 |
| JP | 2006-220624 A | | 8/2006 |
| JP | 2006-300550 A | | 11/2006 |
| JP | 2008-232830 A | | 10/2008 |
| JP | 2009-244136 A | | 10/2009 |
| JP | 2010-025944 A | | 2/2010 |
| JP | 2010-122226 A | | 6/2010 |
| JP | 2012-88238 A | | 5/2012 |

OTHER PUBLICATIONS

David Adamy, "A First Course in Electronic Warfare", Tokyo Denki University Press, total 8 pages.
International Search Report for PCT/JP2016/084065 (PCT/ISA/210) dated Feb. 14, 2017.
International Search Report for PCT/JP2018/001245 (PCT/ISA/210) dated Apr. 17, 2018.
Notice of Reasons for Refusal for Japanese Application No. 2018-546650, dated Oct. 23, 2018.
Ruchir Chauhan, "A Platform for False Data Injection in Frequency Modulated Continuous Wave Radar", All Graduate Theses and Dissertations, 2014, total 79 pages.
Sugawara et al., "Randomizing Chirp Signal for Millimeter Wave Radar", SCIS2017, Jan. 24-27, 2017, total 9 pages.
U.S. Appl. No. 16/341,745, filed Apr. 12, 2019.
U.S. Office Action for U.S. Appl. No. 16/341,745, dated Dec. 3, 2021.
Chinese Office Action and Search Report for Chinese Application No. 201680090711.X, dated Dec. 5, 2022, with English translation.

\* cited by examiner

RADAR APPARATUS AND COMPUTER READABLE MEDIUM

TECHNICAL FIELD

The present invention relates to a radar apparatus that uses a frequency modulated continuous wave.

BACKGROUND ART

A radar is a device that measures the relative distance between the radar and a target object or the relative speed of the target object by irradiating the target object with radio waves and measuring reflected waves. A frequency modulated continuous wave (FMCW) method is one of radar methods, and the FMCW method has excellent distance and speed measurement capabilities while being inexpensive.

In a radar, deception is a threat. Deception signifies an attack that causes radio waves disguised as reflected waves to enter the radar from the outside, thereby causing incorrect measurements. Non-Patent Literature 1 discloses a countermeasure method in which chirps of an FMCW radar are modulated as countermeasures against deception.

CITATION LIST

Non-Patent Literature

Non-Patent Literature 1: Sugawara, Nashimoto, et al., "Randomizing Chirp Signal for Millimeter Wave Radar", SCIS2017 2017 Symposium on Cryptography and Information Security Naha, Japan, Jan. 24-27, 2017, The Institute of Electronics, Information and Communication Engineers.

SUMMARY OF INVENTION

Technical Problem

In order to determine whether an attack is present, the FMCW radar with the countermeasures against deception disclosed in Non-Patent Literature 1 uses hardware components called a time-frequency filter and a detector, which are not used as hardware components in a commonly used FMCW radar.

Therefore, in the radar of Non-Patent Literature 1, the countermeasures against deception cannot be implemented without changing the hardware of the commonly used FMCW radar.

It is an object of the present invention to provide an FMCW radar in which countermeasures against deception can be implemented without changing the hardware configuration of an existing FMCW radar.

Solution to Problem

A radar apparatus according to the present invention includes a random number generation unit to generate a random number sequence of one or more bits;

a local signal generation unit to generate a local signal in accordance with a bit value of each bit of the random number sequence;

a transmission unit to generate a transmission signal by frequency-modulating a carrier with the local signal, and transmit the transmission signal;

a mixer to acquire the transmission signal from the transmission unit, mix the transmission signal and a reception signal received by a receiving antenna, and output a mixer output signal;

a beat signal generation unit to generate a beat signal from the mixer output signal output from the mixer; and a determination unit to execute at least one program of an attenuation determination program, which determines whether an abnormal attenuation is present in the beat signal, and a frequency characteristic determination program, which determines whether an anomaly is present in a frequency characteristic of the beat signal, so as to determine whether the beat signal is abnormal.

Advantageous Effects of Invention

According to a radar apparatus of the present invention, an FMCW radar in which countermeasures against deception can be implemented without changing the hardware configuration of an existing FMCW radar can be provided.

DESCRIPTION OF EMBODIMENTS

First Embodiment

*Configuration of Comparison Example*

A first embodiment relates to a radar apparatus 30 that uses FMCW. In order to clarify the features of the radar apparatus 30, a radar apparatus 10 will be described first as a comparison example of the radar apparatus 30.

Figure 1:
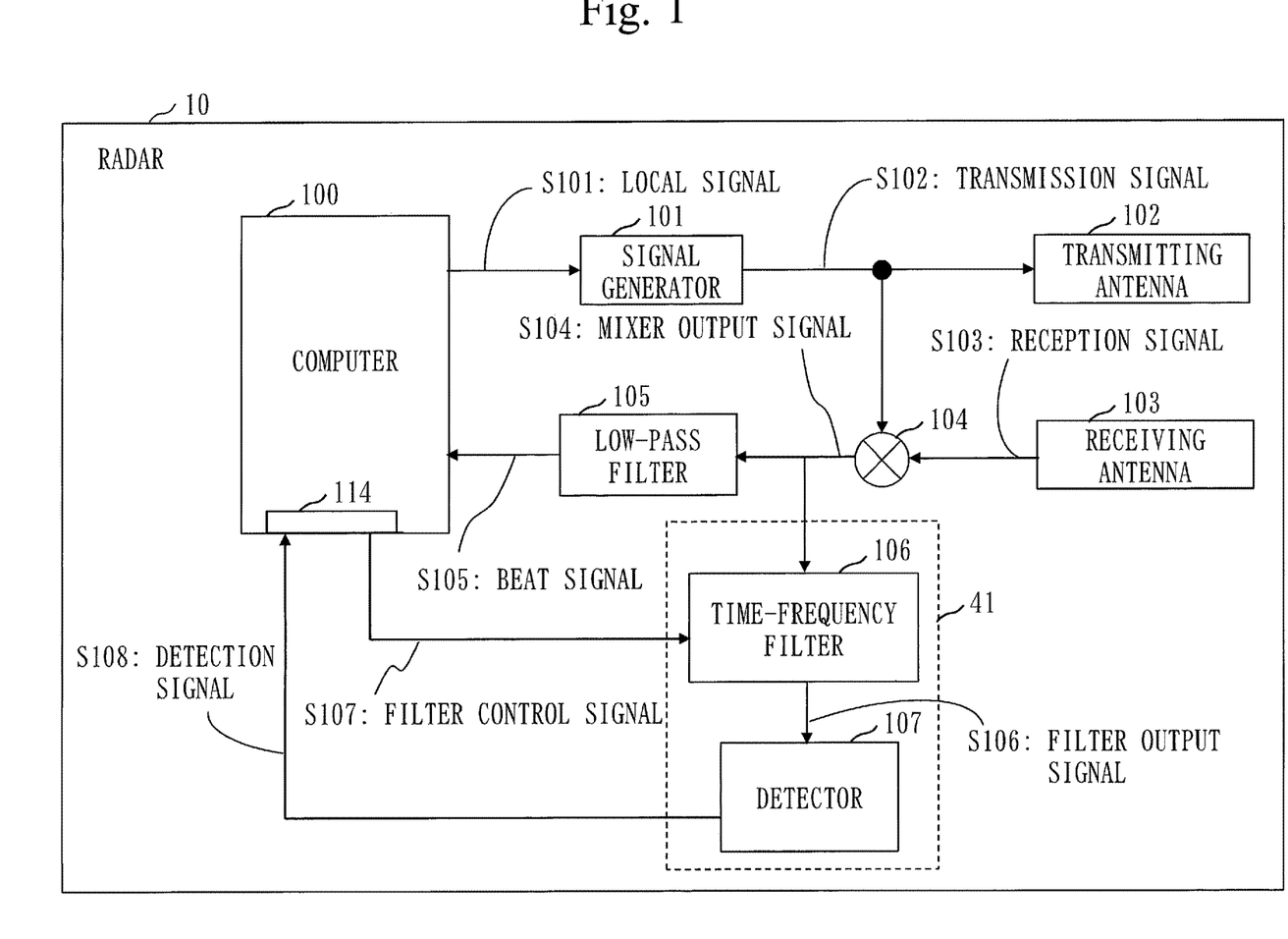
FIG. 1 is a diagram of a first embodiment and is a hardware configuration diagram of a radar 10.

FIG. 1 is a hardware configuration diagram of the radar apparatus 10. The radar apparatus 10 is also a radar apparatus that uses FMCW. In the following, the radar apparatus 10 and the radar apparatus 30 will be described as the radar 10 and the radar 30.

As illustrated in FIG. 1, the radar 10 includes, as hardware components, a computer 100, a signal generator 101, a transmitting antenna 102, a receiving antenna 103, a mixer 104, a low-pass filter 105, a time-frequency filter 106, and a detector 107. As illustrated in FIG. 1, signals transmitted from one hardware component to another hardware component are called a local signal S101, a transmission signal S102, a reception signal S103, a mixer output signal S104, a beat signal S105, a filter output signal S106, a filter control signal S107, and a detection signal S108.

In FIG. 1, the time-frequency filter 106 and the detector 107, which are enclosed in a dotted box 41, are hardware components not required in a commonly used FMCW radar. The time-frequency filter 106 and the detector 107 are hardware components typically included in the FMCW radar, disclosed in FIG. 7 of Non-Patent Literature 1, in which deception countermeasures against deception attacks are implemented.

Figure 2:
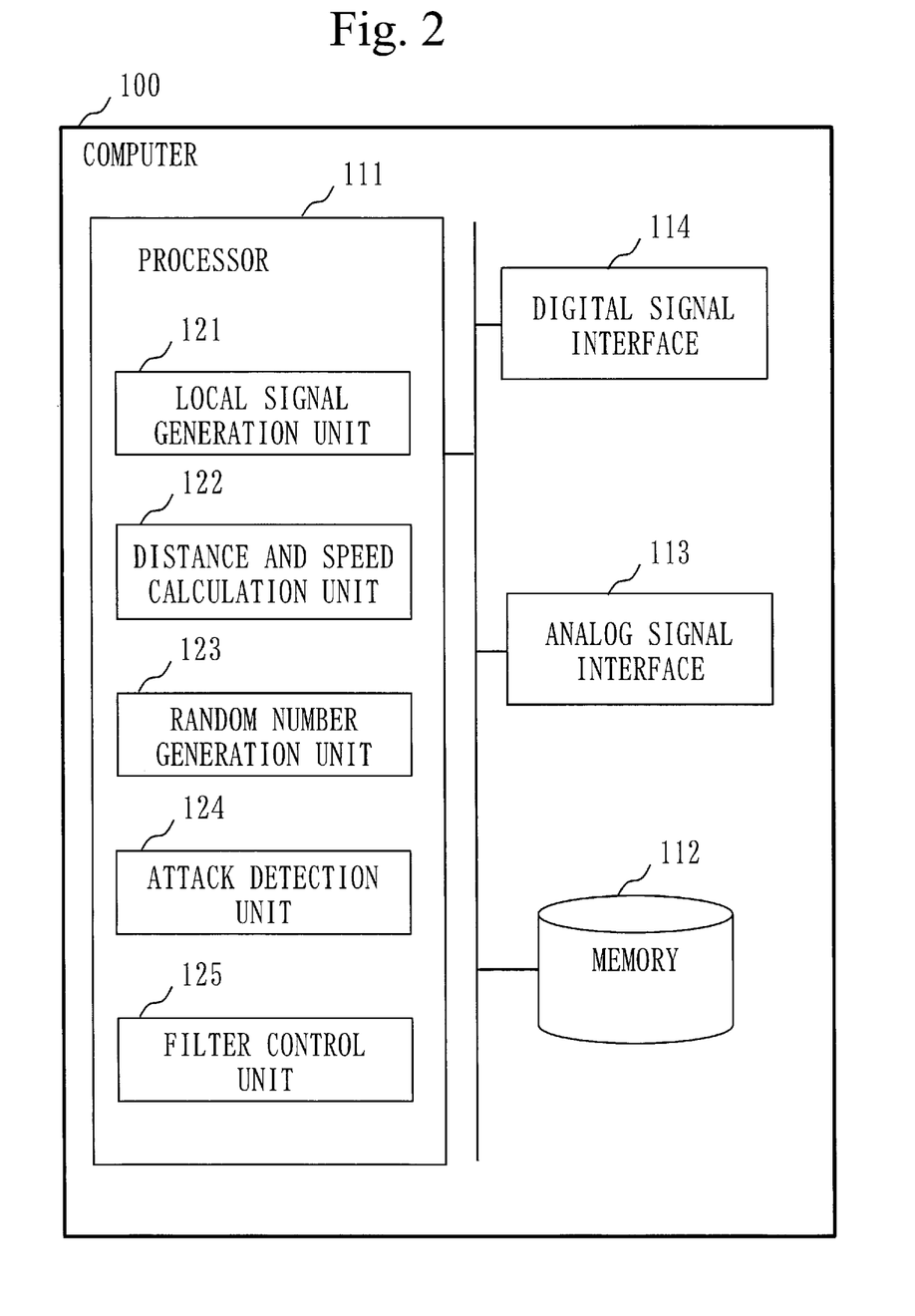
FIG. 2 is a diagram of the first embodiment and is a diagram illustrating a configuration of a computer 100 of the radar 10.

FIG. 2 illustrates a configuration of the computer 100 of the radar 10. The configuration of the computer 100 will be described with reference to FIG. 2. The computer 100 has, as hardware components, a processor 111, a memory 112, an analog signal interface 113, and a digital signal interface 114. The computer 100 includes, as functional elements, a local signal generation unit 121, a distance and speed calculation unit 122, a random number generation unit 123, an attack detection unit 124, and a filter control unit 125.

The analog signal interface 113 and the digital signal interface 114 are used to connect the computer 100 with external hardware components. The external hardware components are the signal generator 101, the low-pass filter 105, the time-frequency filter 106, and the detector 107. The local signal generation unit 121, the distance and speed calculation unit 122, the random number generation unit 123, the attack detection unit 124, and the filter control unit 125, which are the functional elements, are realized by a program. This program is stored in the memory 112, and this program is executed by the processor 111.

The local signal generation unit 121 generates the local signal S101 and outputs the local signal S101 to the signal generator 101. The distance and speed calculation unit 122 calculates the relative distance and the relative speed between the radar 10 and a target object, based on the beat signal S105. The random number generation unit 123 generates a random number sequence. The attack detection unit 124 determines whether an attack is present, based on the detection signal S108. The filter control unit 125 performs setting of the time-frequency filter 106 via the filter control signal S107.

In FIG. 2, the local signal generation unit 121, the distance and speed calculation unit 122, the random number generation unit 123, the attack detection unit 124, and the filter control unit 125, which are the functional elements, are a program, so that a change in or an addition to these functions does not affect the hardware configuration.

*Description of Configuration of Radar 30*

Figure 3:
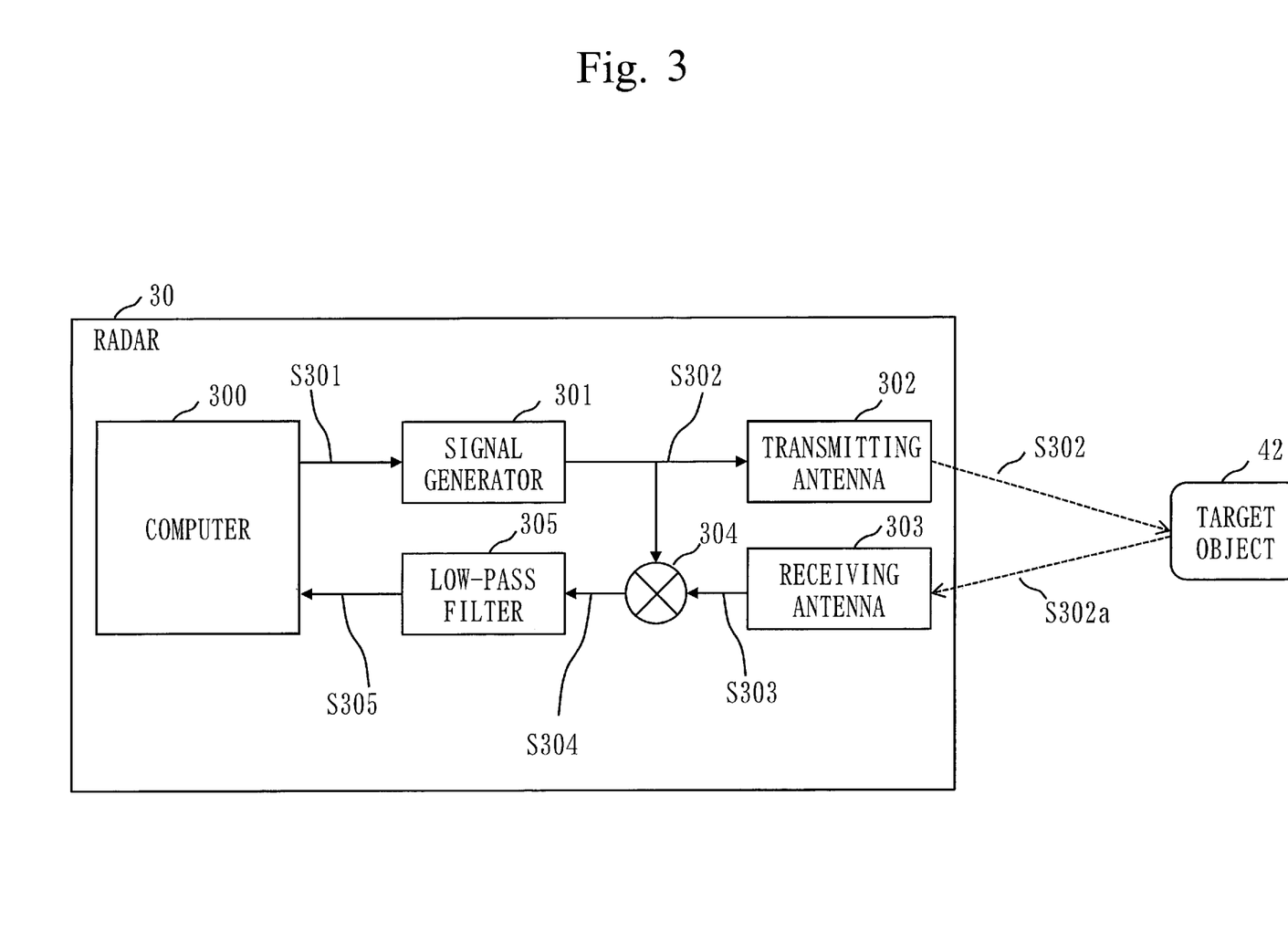
FIG. 3 is a diagram of the first embodiment and is a diagram illustrating a hardware configuration of a radar 30.

FIG. 3 illustrates a hardware configuration of the radar 30 of the first embodiment.

Figure 4:
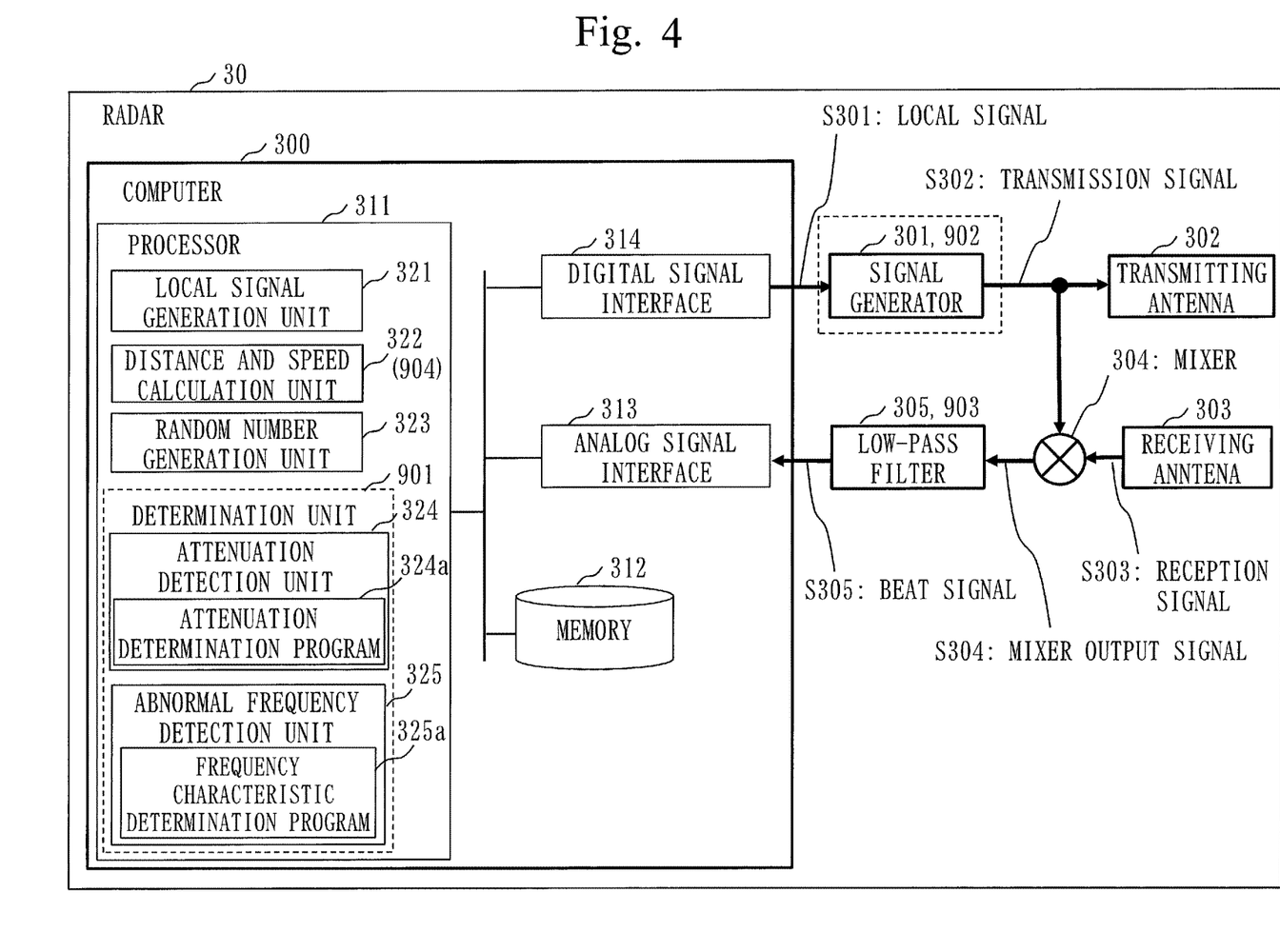
FIG. 4 is a diagram of the first embodiment and is a diagram illustrating an internal configuration of a computer 300 of the radar 30.

FIG. 4 is a diagram illustrating an internal configuration of a computer 300 of the radar 30. The radar 30 uses FMCW. The radar 30 includes, as hardware components, the computer 300, a signal generator 301, which is a transmission unit 902, a transmitting antenna 302, a receiving antenna 303, a mixer 304, and a low-pass filter 305. That is, the radar 30 implements countermeasures against deception by software, so that the hardware configuration of the radar 30 is the same as the hardware configuration of the commonly used FMCW radar without countermeasures against deception.

An internal configuration of the computer 300 will now be described with reference to FIG. 4. The computer 300 has, as hardware components, a processor 311, a memory 312, an analog signal interface 313, and a digital signal interface 314. The computer 300 includes, as functional elements, a local signal generation unit 321, a distance and speed calculation unit 322, a random number generation unit 323, an attenuation detection unit 324, and an abnormal frequency detection unit 325. The attenuation detection unit 324 and the abnormal frequency detection unit 325 constitute a determination unit 901. The attenuation detection unit 324 has an attenuation determination program 324a. The abnormal frequency detection unit 325 has a frequency characteristic determination program 325a.

The local signal generation unit 321, the distance and speed calculation unit 322, the random number generation unit 323, the attenuation detection unit 324, and the abnormal frequency detection unit 325 are realized by a program. The program is stored in the memory 312 and executed by the processor 311. Note that the processor is also referred to as processing circuitry. That is, the functions of the local signal generation unit 321, the distance and speed calculation unit 322, the random number generation unit 323, the attenuation detection unit 324, and the abnormal frequency detection unit 325 are realized by the processing circuitry.

(1) The local signal generation unit 321 generates a local signal S301, and outputs the local signal S301 to the signal generator 301 via the digital signal interface 314.

(2) The distance and speed calculation unit 322, which is a calculation unit 904, calculates the relative distance between the radar 30 and a target object 42 and the relative speed of the target object, based on a beat signal S305 acquired via the analog signal interface 313.

(3) The random number generation unit 323 generates a random number sequence.

(4) The attenuation detection unit 324 detects an attenuation in the beat signal S305.

(5) The abnormal frequency detection unit 325 detects an anomaly in the frequency characteristic of the beat signal S305.

(6) The functions of the attenuation detection unit 324 and the abnormal frequency detection unit 325 are newly added functions in relation to the technology disclosed in "Non-Patent Literature 1". That is, the determination unit 901 composed of the attenuation detection unit 324 and the abnormal frequency detection unit 325 is a newly added function in relation to "Non-Patent Literature 1".

The processor 311 is a device to execute an anomaly determination program. The anomaly determination program is the program for realizing the functions of the local signal generation unit 321, the distance and speed calculation unit 322, the random number generation unit 323, the attenuation detection unit 324, and the abnormal frequency detection unit 325. The anomaly determination program is stored in the memory 112. The anomaly determination program is the program for causing the computer 300 to execute each process, each procedure, or each step, where the "unit" of each of the local signal generation unit 321, the distance and speed calculation unit 322, the random number generation unit 323, the attenuation detection unit 324, and the abnormal frequency detection unit 325 is interpreted as the "process", "procedure", or "step". An anomaly determination method is a method performed by the execution of the anomaly determination program by the computer 300. The anomaly determination program may be stored and provided in a computer readable recording medium, or may be provided as a program product.

*Description of Operation of Radar 30*

Figure 5:
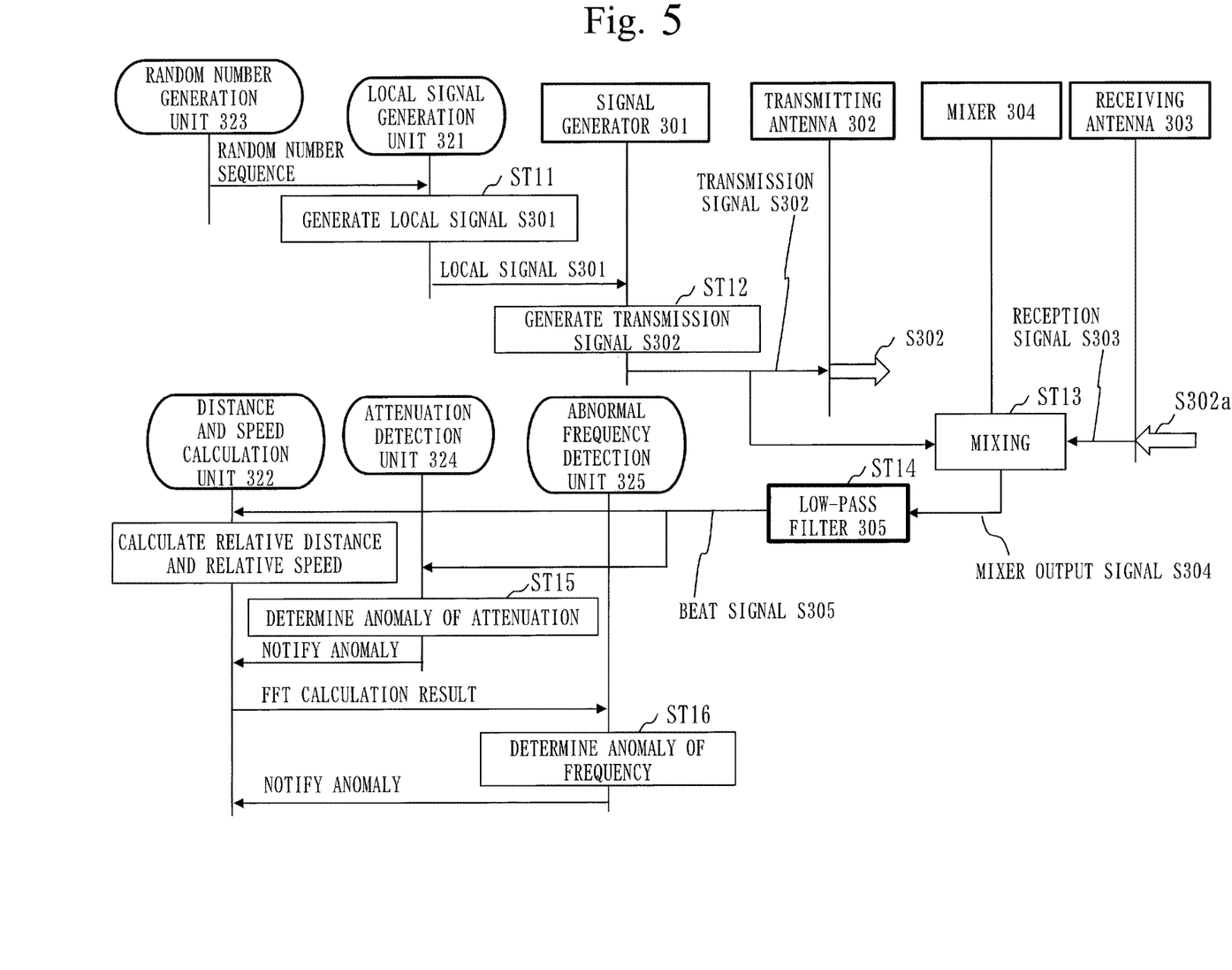
FIG. 5 is a diagram of the first embodiment and is a sequence diagram illustrating operation of the radar 30.

FIG. 5 is a sequence indicating operation of the radar 30. The operation of the radar 30 will be described with reference to FIG. 5.

In step ST11, the local signal generation unit 321 generates a local signal S301, using a random number sequence generated by the random number generation unit 323. The random number sequence generated by the random number generation unit 323 may be a 1-bit random number sequence. The random number sequence and the local signal S301 are to be described when the generation of a transmission signal S302 is described.

In step ST12, the signal generator 301 generates the transmission signal S302 by frequency-modulating a carrier with the local signal S301.

Figure 6:
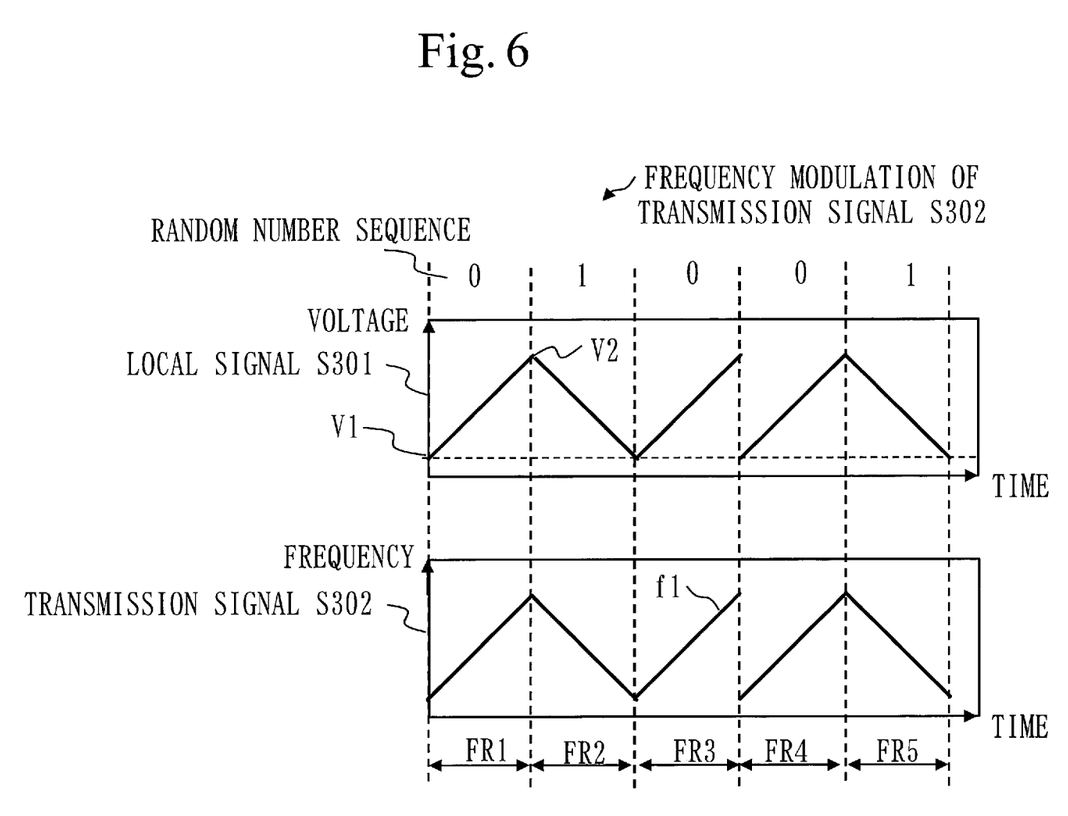
FIG. 6 is a diagram of the first embodiment and is a diagram illustrating frequency modulation of a transmission signal S302.

FIG. 6 illustrates the generation of the transmission signal S302. The upper section of FIG. 6 indicates the local signal S301, and the horizontal axis indicates time and the vertical axis indicates voltage. The lower section indicates the transmission signal S302, and the horizontal axis indicates time and the vertical axis indicates frequency. The time of the horizontal axis of the transmission signal S302 is the same as the time of the horizontal axis of the local signal S301. The random number generation unit 323 generates, for example, a random number sequence "0, 1, 0, 0, 1 . . . ".

The local signal generation unit 321 generates a local signal in accordance with the bit value of each bit of the random number sequence "0, 1, 0, 0, 1 . . . ". In FIG. 6, the local signal generation unit 321 generates a local signal whose voltage increases linearly from V1 to V2 with time when the bit value is 0, and generates a local signal whose voltage decreases linearly from V2 to V1 with time when the bit value is 1. The signal generator 301 generates the transmission signal S302 by frequency-modulating the carrier with the local signal S301. As illustrated in FIG. 6, the signal generator 301 generates the transmission signal S302 whose frequency is higher as the voltage of the local signal S301 is higher.

The transmission signal S302 is distributed to the transmitting antenna 302 and the mixer 304. The transmission signal S302 is radiated into space from the transmitting antenna 302. As illustrated in FIG. 3, the receiving antenna 303 detects a reflected signal S302a that is the transmission signal S302 reflecting off the target object 42. The reflected signal S302a detected by the receiving antenna 303 is a reception signal S303.

In step ST13, the reception signal S303 is mixed with the transmission signal S302 by the mixer 304. The mixer 304 acquires the transmission signal S302 from the signal generator 301, mixes the transmission signal S302 with the reception signal S303 received by the receiving antenna 303, and outputs a mixer output signal S304.

In step ST14, the low-pass filter 305, which is a beat signal generation unit 903, generates a beat signal S305 from the mixer output signal S304 output from the mixer 304.

When the mixer output signal S304 passes through the low-pass filter 305, the beat signal S305 resulting from extracting only low-frequency components from the mixer output signal S304 is obtained.

The mixer output signal S304 is a synthesized sine wave expressed by Equation 1 as indicated below.

$$\cos f_s t \cdot \cos f_r t = [\cos\{(f_s-f_r)t\} + \cos\{(f_s+f_r)t\}]/2 \quad \text{(Equation 1)}$$

Note that $f_s t$ denotes the transmission signal S302 and $f_r t$ denotes the reception signal S303. When the mixer output signal S304 expressed by Equation 1 passes through the low-pass filter 305, low-frequency components are extracted. This results in the beat signal S305.

The beat signal S305 is expressed by Equation 2 as indicated below.

$$\cos f_s t \cdot \cos f_r t = \cos\{(f_s-f_r)t\}/2 \quad \text{(Equation 2)}$$

That is, the beat signal S305 represents a difference in frequency between the transmission signal S302 and the reception signal S303.

The distance and speed calculation unit 322 analyzes the beat signal S305, so as to calculate the relative distance or the relative speed between the radar 30 and the target object 42. As will be described later, a frame determined as abnormal by the attenuation detection unit 324 or the abnormal frequency detection unit 325, among frames of the beat signal S305, is excluded from the calculation of the relative distance and the relative speed and is not used for the calculation. Note that frames are pieces of data along the time axis that are cut out at fixed time intervals from a graph whose horizontal axis is time.

The determination unit 901 executes at least one program of the attenuation determination program 324a, which determines whether an abnormal attenuation is present in the beat signal S305, and the frequency characteristic determination program 325a, which determines whether an anomaly is present in the frequency characteristic of the beat signal, so as to determine whether the beat signal S305 is abnormal.

In step ST15, the attenuation detection unit 324 determines, for each frame of the beat signal S305, whether the signal has attenuated significantly as a result of passing through the low-pass filter 305. Upon determining a significant attenuation, the attenuation detection unit 324 determines that the frame is abnormal.

Specifically, the attenuation detection unit 324 of the determination unit 901 executes the attenuation determination program 324a. The attenuation determination program 324a calculates a signal strength value indicating the signal strength of the beat signal S305, and compares the calculated signal strength value with a signal strength threshold, so as to determine whether an abnormal attenuation is present in the beat signal S305. The signal strength value and the signal strength threshold are $\int_{T1}^{T2} f^2(t)dt$ and a threshold $\sigma_{th}$, which are to be described with reference to FIG. 9. $\int_{T1}^{T2} f^2(t)dt$ is the definite integral of the square of a signal f(t) from a start time T1 to an end time T2 of the frame. The start time T1 and the end time T2 are the start time and the end time of each of frames FR1 to FR5 in FIG. 9 to be described later.

The distance and speed calculation unit 322 performs a fast Fourier transform (FFT) process on each frame.

In step ST16, the abnormal frequency detection unit 325 of the determination unit 901 executes the frequency characteristic determination program 325a. The frequency characteristic determination program 325a determines whether an anomaly is present in the frequency characteristic of the beat signal S305, using a result of performing the fast Fourier transform on the beat signal S305. Specifically, the abnormal frequency detection unit 325 executes the frequency characteristic determination program 325a, so as to determine, for each frame, whether the frequency at which the signal strength peaks deviates from a frequency range expected for the beat frequency, using the output of the FFT process on each frame. Upon determining that the frequency at which the signal strength peaks deviates from the expected frequency range, the abnormal frequency detection unit 325 determines that the frame is abnormal.

The frame that is determined as abnormal by the attenuation detection unit 324 or the abnormal frequency detection unit 325 is notified to the distance and speed calculation unit 322 from the attenuation detection unit 324 or the abnormal frequency detection unit 325. The distance and speed calculation unit 322 excludes the frame notified as being abnormal from subsequent signal processing.

As described above, the attenuation detection unit 324 and the abnormal frequency detection unit 325 determine, for each frame of the beat signal S305, whether or not the beat signal S305 is abnormal. The distance and speed calculation unit 322 calculates measurement information including at least one of the distance to the target object 42 and the speed of the target object 42, based on the beat signal S305. At this time, the distance and speed calculation unit 322 excludes a frame determined as abnormal by at least one of the attenuation detection unit 324 and the abnormal frequency detection unit 325 from being used for calculating the measurement information.

The detection of an anomaly by the attenuation detection unit 324 and the abnormal frequency detection unit 325 will be described with reference to FIGS. 7 to 10. That is, the detection of an attack by the attenuation detection unit 324 and the abnormal frequency detection unit 325 will be described.

Figure 7:
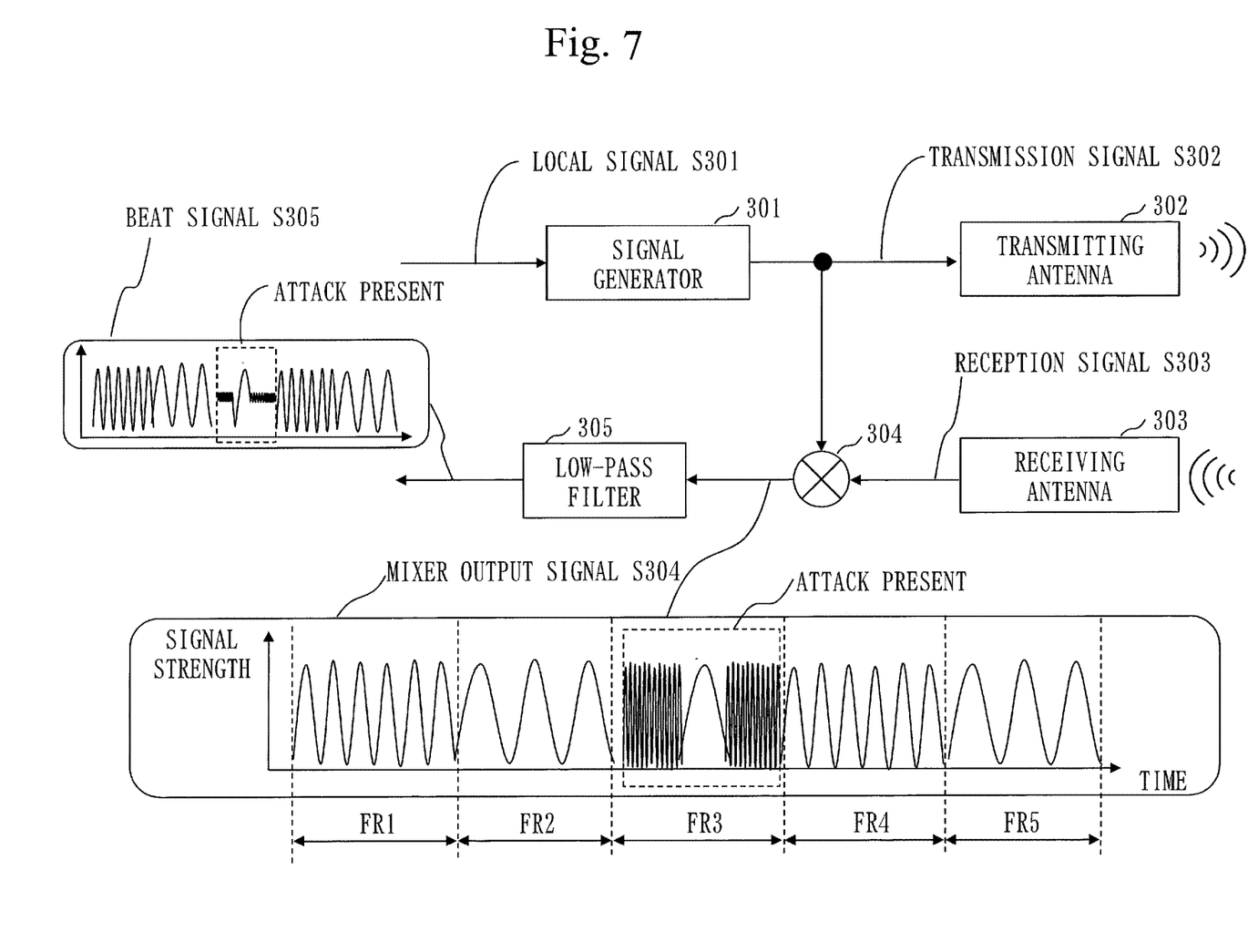
FIG. 7 is a diagram of the first embodiment and is a diagram illustrating details of input and output of the computer 300.

FIG. 7 illustrates details of input and output of the computer 300.

Figure 8:
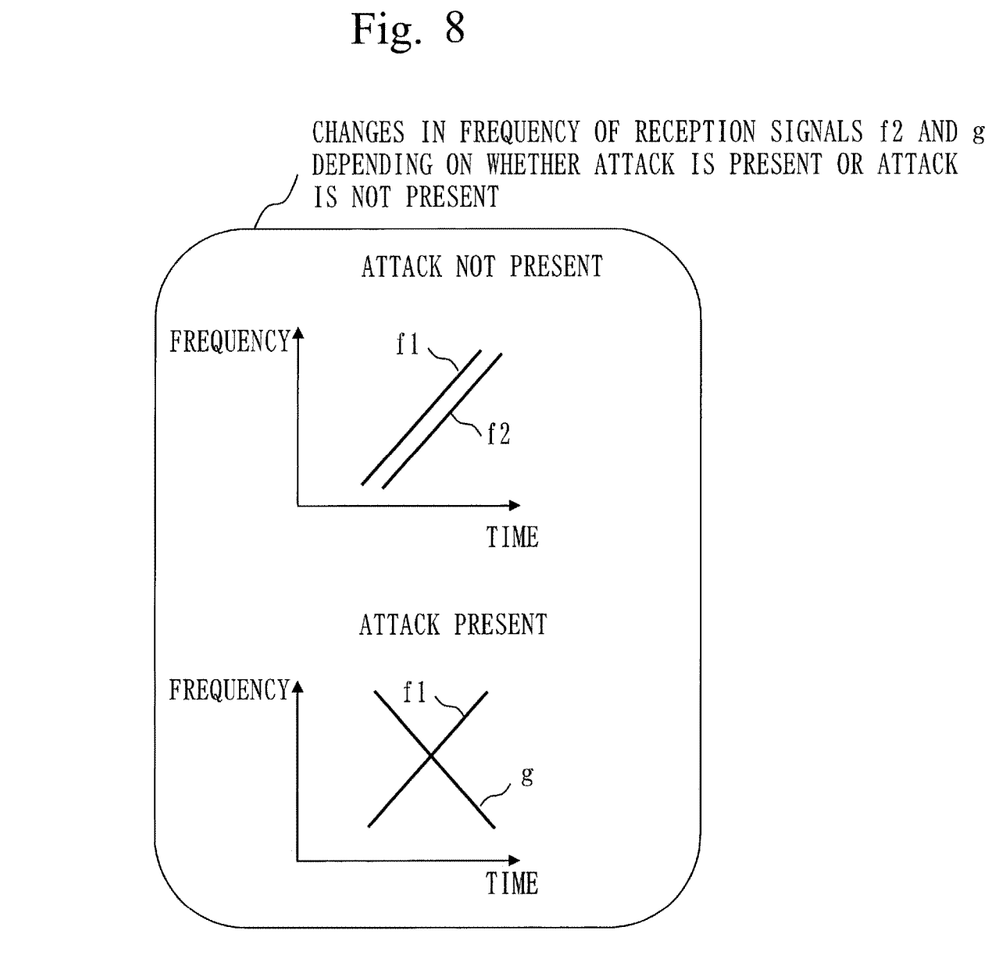
FIG. 8 is a diagram of the first embodiment and is a diagram illustrating changes in frequency of a reception signal S303 depending on whether an attack is present or an attack is not present.

FIG. 8 illustrates changes in frequency of the reception signal S303 depending on whether an attack is present or an attack is not present. The upper chart indicates a case in which an attack is not present, and the lower chart indicates a case in which an attack is present. In each of the upper and lower charts, the horizontal axis indicates time and the vertical axis indicates frequency. In the upper chart, a signal f1 indicates the transmission signal S302 and a signal f2 indicates the reception signal S303. In the lower chart, a signal f1 indicates the transmission signal S302 and a signal g indicates the reception signal S303.

Figure 9:
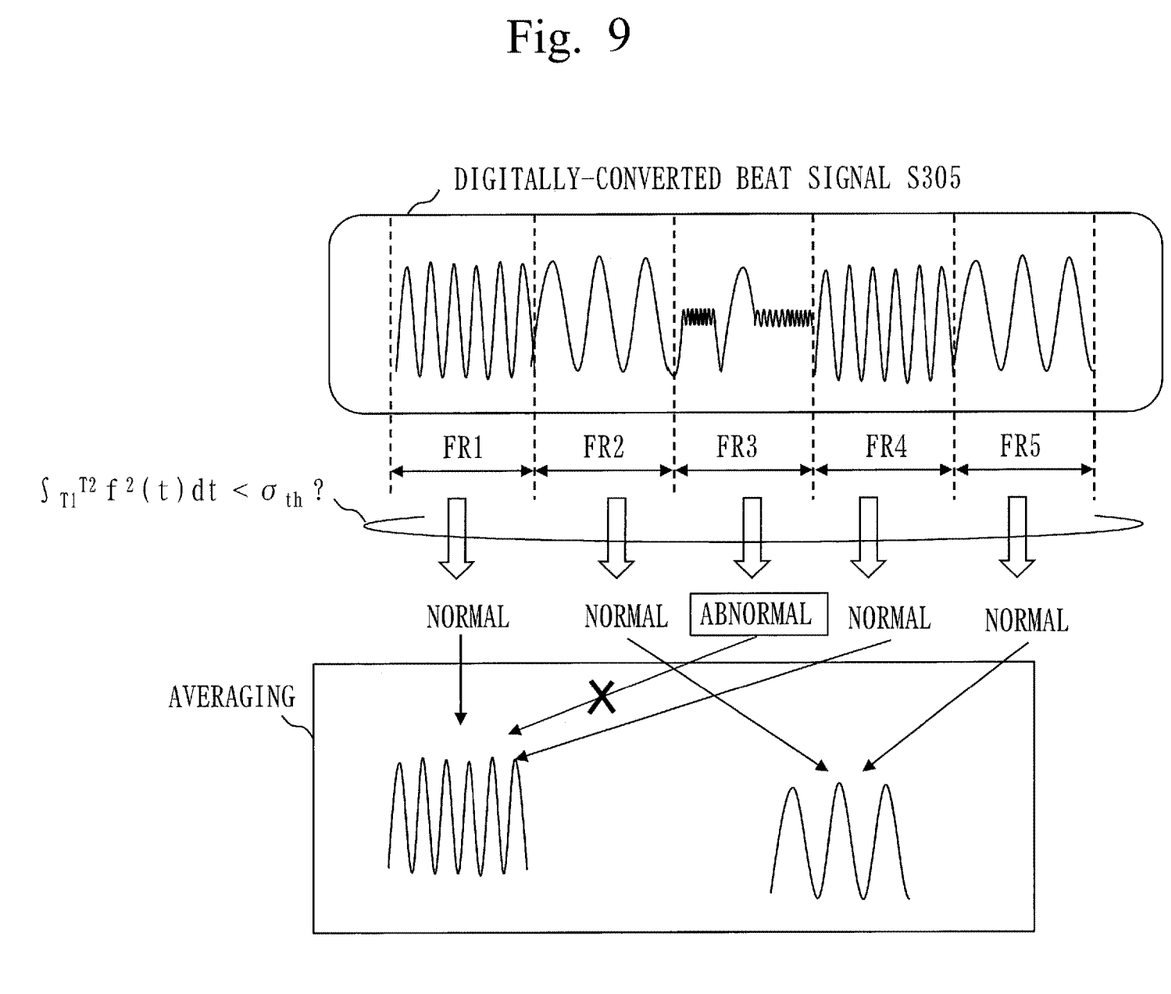
FIG. 9 is a diagram of the first embodiment and is a diagram illustrating the determination of an anomaly in a beat signal S305 by an attenuation detection unit 324.

FIG. 9 illustrates the determination of an anomaly in the beat signal S305 by the attenuation detection unit 324. The beat signal S305 includes the signal g of an attacker. The beat signal S305 in FIG. 9 has been converted into a digital signal by the analog signal interface 313. The same also applies to the beat signal S305 in FIG. 10.

Figure 10:
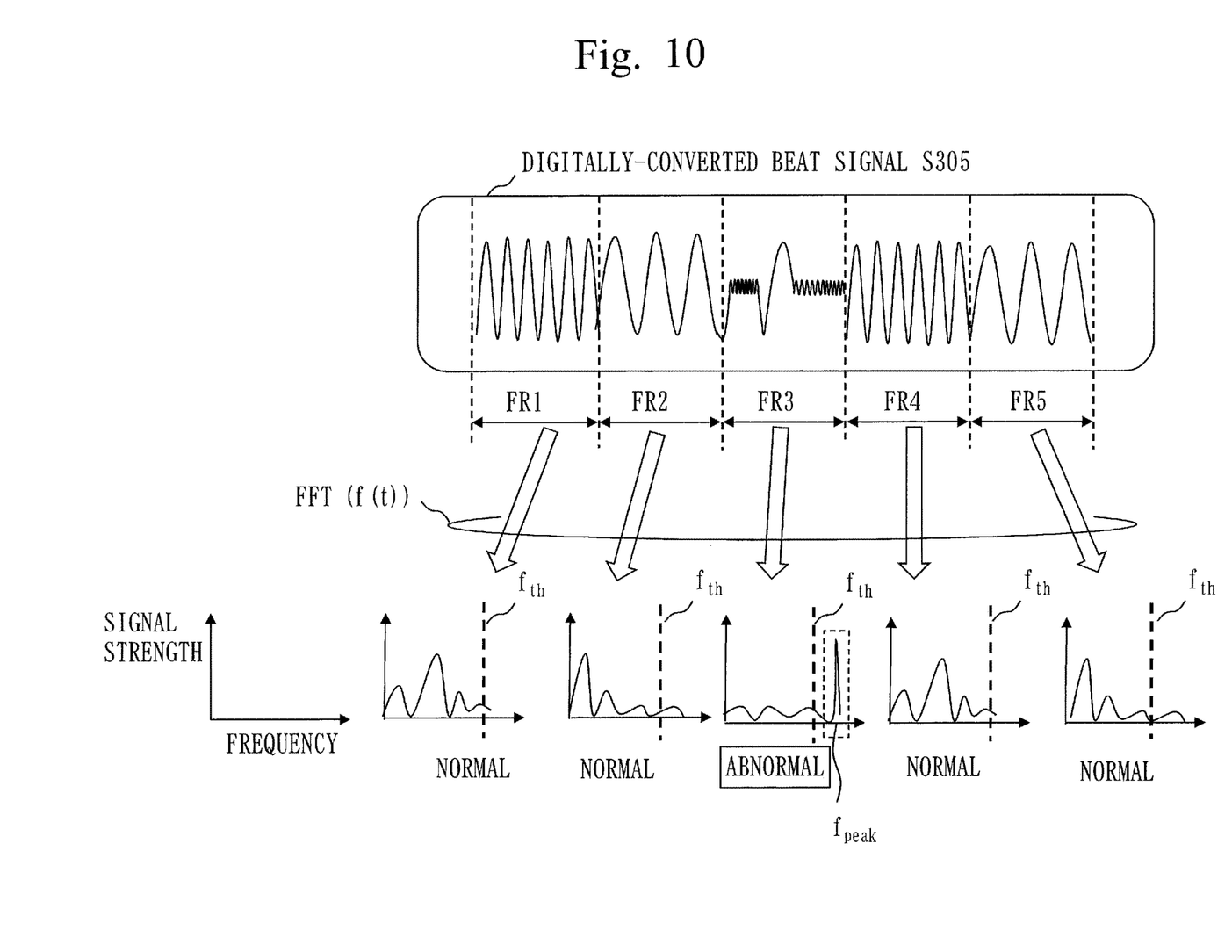
FIG. 10 is a diagram of the first embodiment and is a diagram illustrating the determination of an anomaly in the beat signal S305 by an abnormal frequency detection unit 325.

FIG. 10 illustrates the determination of an anomaly in the beat signal S305 by the abnormal frequency detection unit 325.

The beat signals S305 illustrated in FIGS. 9 and 10 correspond to the transmission signal S302 illustrated in FIG. 6. Note that the modulation method is not limited to the modulation method of FIG. 6.

If the attacker cannot correctly predict the modulation method of FIG. 6, the transmission wave of the attacker, that is, the reception signal S303 from the attacker differs greatly in frequency from the transmission signal S302, which is the signal f1, as in the case of the signal g in the lower chart of FIG. 8. Due to this characteristic, a high-frequency signal section is observed in the mixer output signal S304. FIG. 7 illustrates the mixer output signal S304 including the signal g of the attacker.

The mixer output signal S304 in FIG. 7 indicates a state in which an attack has occurred in the third chirp frame FR3 of chirp frames FR1 to FR5 of the transmission signal S302 in FIG. 6. That is, the chirp frames FR1 to FR5 in FIG. 6 correspond to frames FR1 to FR5 of the mixer output signal S304 in FIG. 7. The chirp frames FR1 to FR5 in FIG. 6 correspond to frames FR1 to FR5 of the beat signals S305 illustrated in FIGS. 9 and 10. As indicated in the beat signal S305 in FIG. 7, when the mixer output signal S304 passes through the low-pass filter 305, the high-frequency signal in the section in which the attack has occurred attenuates.

Note that in the case of the modulation method using up-chirps and down-chirps illustrated in FIG. 6, if modulation extremely biased to one of up-chirps and down-chirps is performed, the accuracy of subsequent signal processing will be affected. Therefore, the random number generation unit 323 adjusts the frequencies of appearance of 0 and 1 when generating a multi-bit random number sequence. That is, the random number generation unit 323 may generate a restricted random number sequence, depending on the modulation method. For example, the random number generation unit 323 performs an encoding process to generate a random number sequence having the same Hamming weight. That is, chirp modulation is performed with a vector obtained by rG, where G is a generator matrix and r is a random number sequence.

The determination of an anomaly performed by the attenuation detection unit 324 using the attenuation determination program 324a will be described with reference to FIG. 9. The beat signal S305 is sampled by the analog signal interface 313 and converted into a digital signal. The processor 311 processes the digitally converted beat signal S305 in units of n frames, where n is an integer. In FIG. 9, n is 5. The attenuation detection unit 324 divides the beat signal S305 converted into a digital signal into frames, and determines whether an abnormal attenuation is present in each frame. As an example of the determination method, the attenuation detection unit 324 calculates an amount equivalent to the root mean square and performs a determination based on a threshold. In FIG. 9, the attenuation detection unit 324 calculates $\int_{T1}^{T2} f^2(t)dt$, for each frame, with regard to the signal f(t) in the frame. The attenuation detection unit 324 compares the calculated $\int_{T1}^{T2} f^2(t)dt$ with the threshold $\sigma_{th}$ pre-defined in the program.

In the case of $\int_{T1}^{T2} f^2(t)dt < \sigma_{th}$, the attenuation detection unit 324 determines that an abnormal attenuation is present in the frame and determines the frame in which the abnormal attenuation is present as abnormal. The frame determined as abnormal is excluded from subsequent averaging processing.

The determination of an anomaly in the frequency characteristic performed by the abnormal frequency detection unit 325 using the frequency characteristic determination program 325a will be described with reference to FIG. 10. The beat signal S305 is sampled by the analog signal interface 313 and converted into a digital signal. The abnormal frequency detection unit 325 processes the digitally converted beat signal S305 in units of n frames.

In FIG. 10, n is 5 as in FIG. 9. The distance and speed calculation unit 322 divides the digitally converted beat signal S305 into frames, and performs FFT on each frame. FFT is also performed in the commonly used radar in which countermeasures against deception are not implemented. In signal processing by the distance and speed calculation unit 322, FFT is performed on each frame, which is called a fast chirp.

When the distance and speed calculation unit 322 does not perform FFT on a per frame basis, the abnormal frequency detection unit 325 may perform FFT. As illustrated in FIG. 10, the abnormal frequency detection unit 325 calculates a frequency $f_{peak}$ of a peak signal strength value with regard to the result of FFT on each frame.

If the frequency $f_{peak}$ is a frequency higher than a predetermined threshold $f_{th}$, the abnormal frequency detection unit 325 determines that an anomaly is present in the frequency characteristic of the beat signal S305, and determines that the frame is abnormal. The frame determined as abnormal is excluded from subsequent signal processing. In FIG. 10, frame FR3 is abnormal.

The threshold $f_{th}$ can be determined from the hardware characteristics, ranging limit, and measurable speed limit of the radar 30. For example, assume that the center frequency is 24 GHz, the chirp sweep speed is 160 [GHz/s], and the ranging limit is 60 m. In this case, the maximum value of a frequency shift fr based on the relative distance is fr as indicated below.

$$fr=2\times 60 \text{ [m]} \times 160 \text{ [GHz/s]}/(3\times 10^8) \text{ [m/s]}=64 \text{ [kHz]}$$

When the measurable speed limit is 300 Km/h, a Doppler shift fv is calculated as indicated below.

$$fv=300 \text{ [km/h]}/(3\times 10^8) \text{ [m/s]} \times 24 \text{ [GHz]}=6.67 \text{ [KHz]}$$

Therefore, based on the threshold $f_{th}$=64+6.67, the threshold $f_{th}$ can be determined as 70 KHz.

Effects of First Embodiment

In the radar 30, the local signal generation unit 321 generates the local signal S301 based on a random number sequence, and the signal generator 301 generates the transmission signal S302 from the local signal S301, as described with reference to FIG. 6. Then, a determination using a threshold is performed by the attenuation detection unit 324 and the abnormal frequency detection unit 325, which are realized by software, without using hardware components of a time-frequency filter and a detector, which have been conventionally required. A frame determined as abnormal in the beat signal S305, that is, section information of an attacked chirp, is excluded from a series of frames by the distance and speed calculation unit 322. As a result, ranging can be performed without being affected by an attack. Therefore, according to the radar 30, an FMCW deception attack can be prevented by adding functions by a program, without changing the hardware configuration of a commonly used FMCW apparatus.

REFERENCE SIGNS LIST

S101, S301: local signal; S102, S302: transmission signal; S103, S303: reception signal; S104, S304: mixer output signal; S105, S305: beat signal; S106: filter output signal; S107: filter control signal; 10, 30: radar; 41: box; 42: target object; 100: computer; 101: signal generator; 102: transmitting antenna; 103: receiving antenna; 104: mixer; 105: low-pass filter; 106: time-frequency filter; 107: detector; 111: processor; 112: memory; 113: analog signal interface; 114: digital signal interface; 121: local signal generation unit; 122: distance and speed calculation unit; 123: random number generation unit; 124: attack detection unit; 125: filter control unit; 300: computer; 301: signal generator; 302: transmitting antenna; 303: receiving antenna; 304: mixer; 305: low-pass filter; 311: processor; 312: memory; 313: analog signal interface; 314: digital signal interface; 321: local signal generation unit; 322: distance and speed calculation unit; 323: random number generation unit; 324: attenuation detection unit; 324*a*: attenuation determination program; 325: abnormal frequency detection unit; 325*a*: frequency characteristic determination program; 901: determination unit; 902: transmission unit; 903: beat signal generation unit; 904: calculation unit

The invention claimed is:

1. A radar apparatus comprising:
   processing circuitry to:
   generate a random number sequence of a plurality of bits, and
   generate a local signal in accordance with a bit value of each bit of the random number sequence for a certain period of time, the local signal being generated for each bit value and having a voltage that changes with time;
   a signal generator to generate a transmission signal by frequency-modulating a carrier according to the voltage of the local signal, and transmit the transmission signal;
   a mixer to acquire the transmission signal from the signal generator, mix the transmission signal and a reception signal received by a receiving antenna, and output a mixer output signal; and
   a beat signal generator to generate a beat signal from the mixer output signal output from the mixer,
   wherein the processing circuitry executes at least one program of an attenuation determination program, which determines whether an abnormal attenuation is present in the beat signal, and a frequency characteristic determination program, which determines whether an anomaly is present in a frequency characteristic of the beat signal, so as to determine for each frame of the beat signal whether the beat signal is abnormal,
   wherein the processing circuitry executes the attenuation determination program, and
   wherein the attenuation determination program calculates, for each frame, a signal strength value indicating a signal strength of the beat signal, and compares the calculated signal strength value with a signal strength threshold, so as to determine for each frame whether an abnormal attenuation is present in the beat signal.

2. The radar apparatus according to claim 1,
   wherein the processing circuitry executes the frequency characteristic determination program, and
   wherein the frequency characteristic determination program determines for each frame whether an anomaly is present in the frequency characteristic of the beat signal, using a result of performing a fast Fourier transform on the beat signal of each frame.

3. The radar apparatus according to claim 2,
   wherein the processing circuitry calculates measurement information including at least one of a distance to a measurement target and a speed of the measurement target, based on the beat signal, and
   excludes the frame determined as abnormal from being used for calculating the measurement information.

4. The radar apparatus according to claim 3,
   wherein the random number generator adjusts frequencies of appearance of 0 and 1 when generating the random number sequence of a plurality of bits.

5. The radar apparatus according to claim 2,
   wherein the random number generator adjusts frequencies of appearance of 0 and 1 when generating the random number sequence of a plurality of bits.

6. The radar apparatus according to claim 1,
   wherein the processing circuitry calculates measurement information including at least one of a distance to a measurement target and a speed of the measurement target, based on the beat signal, and
   excludes the frame determined as abnormal from being used for calculating the measurement information.

7. The radar apparatus according to claim 6,
   wherein the random number generator adjusts frequencies of appearance of 0 and 1 when generating the random number sequence of a plurality of bits.

8. The radar apparatus according to claim 1,
   wherein the random number generator adjusts frequencies of appearance of 0 and 1 when generating the random number sequence of a plurality of bits.

9. A non-transitory computer readable medium storing an anomaly determination program for causing a computer to execute:

a random number generation process to generate a random number sequence of a plurality of bits;

a local signal generation process to generate a local signal in accordance with a bit value of each bit of the random number sequence for a certain period of time, the local signal being generated for each bit value and having a voltage that changes with time; and a determination process to execute at least one program of an attenuation determination program, which determines for each frame of a beat signal whether an abnormal attenuation is present in the beat signal, and a frequency characteristic determination program, which determines for each frame of the beat signal whether an anomaly is present in a frequency characteristic of the beat signal, the beat signal being obtained when a mixed signal passes through a low-pass filter, the mixed signal being a mixture of a transmission signal resulting from frequency-modulating a carrier according to the voltage of the local signal and a reception signal received by a receiving antenna, wherein the determination process executes the attenuation determination program, and wherein the attenuation determination program calculates, for each frame, a signal strength value indicating a signal strength of the beat signal, and compares the calculated signal strength value with a signal strength threshold, so as to determine for each frame whether an abnormal attenuation is present in the beat signal.

10. The non-transitory computer readable medium storing the anomaly determination program according to claim 9, wherein the determination process executes the frequency characteristic determination program, and wherein the frequency characteristic determination program determines for each frame whether an anomaly is present in the frequency characteristic of the beat signal, using a result of performing a fast Fourier transform on the beat signal of each frame.

11. The non-transitory computer readable medium storing the anomaly determination program according to claim 10, the anomaly determination program further causing the computer to execute a calculation process to calculate measurement information including at least one of a distance to a measurement target and a speed of the measurement target, based on the beat signal, wherein the calculation process excludes the frame determined as abnormal by the determination process from being used for calculating the measurement information.

12. The non-transitory computer readable medium storing the anomaly determination program according to claim 11, wherein the random number generation process adjusts frequencies of appearance of 0 and 1 when generating the multi-bit random number sequence of a plurality of bits.

13. The non-transitory computer readable medium storing the anomaly determination program according to claim 10, wherein the random number generation process adjusts frequencies of appearance of 0 and 1 when generating the multi-bit random number sequence of a plurality of bits.

14. The non-transitory computer readable medium storing the anomaly determination program according to claim 9, the anomaly determination program further causing the computer to execute a calculation process to calculate measurement information including at least one of a distance to a measurement target and a speed of the measurement target, based on the beat signal, wherein the calculation process excludes the frame determined as abnormal by the determination process from being used for calculating the measurement information.

15. The non-transitory computer readable medium storing the anomaly determination program according to claim 14, wherein the random number generation process adjusts frequencies of appearance of 0 and 1 when generating the multi-bit random number sequence of a plurality of bits.

16. The non-transitory computer readable medium storing the anomaly determination program according to claim 9, wherein the random number generation process adjusts frequencies of appearance of 0 and 1 when generating the multi-bit random number sequence of a plurality of bits.

* * * * *